US006874991B2

(12) United States Patent
Braun et al.

(10) Patent No.: US 6,874,991 B2
(45) Date of Patent: Apr. 5, 2005

(54) FAN ARRANGEMENT FOR AN ELECTRICAL MACHINE

(75) Inventors: Horst Braun, Stuttgart (DE); Thomas Berger, Ditzingen (DE); Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 10/275,219

(22) PCT Filed: Mar. 8, 2002

(86) PCT No.: PCT/DE02/00817

§ 371 (c)(1),
(2), (4) Date: Jan. 13, 2003

(87) PCT Pub. No.: WO02/073771

PCT Pub. Date: Sep. 19, 2002

(65) Prior Publication Data

US 2003/0228217 A1 Dec. 11, 2003

(30) Foreign Application Priority Data

Mar. 9, 2001 (DE) .......................... 101 11 292

(51) Int. Cl.$^7$ ............................................. F01D 25/26
(52) U.S. Cl. .................. 415/213.1; 415/223 R
(58) Field of Search ............................. 415/213.1, 219, 415/215, 178, 211.1, 223, 204, 208.3, 213 R; 416/182–186

(56) References Cited

U.S. PATENT DOCUMENTS

| 3,893,817 A | * | 7/1975 | Hackbarth et al. ......... 29/889.4 |
| 4,115,030 A | | 9/1978 | Inagaki |
| 4,184,804 A | | 1/1980 | Inagaki |
| 5,559,379 A | * | 9/1996 | Voss ............................. 310/63 |
| 5,979,541 A | * | 11/1999 | Saito .......................... 165/80.3 |
| 6,132,170 A | * | 10/2000 | Horng ......................... 415/178 |
| 6,144,020 A | * | 11/2000 | Usui et al. .................. 219/631 |
| 6,439,299 B1 | * | 8/2002 | Miyahara et al. ........... 165/121 |

FOREIGN PATENT DOCUMENTS

FR   2 745 439 A   8/1997

OTHER PUBLICATIONS

Patent Abstracts of Japan vol. 005, No. 171 (E–080), Oct. 30, 1981 & jp 56 098358 A, Aug. 7, 1981.

\* cited by examiner

*Primary Examiner*—F. Daniel Lopez
*Assistant Examiner*—James M. McAleenan
(74) *Attorney, Agent, or Firm*—Michael J. Striker

(57) ABSTRACT

The invention relates to a fan apparatus for an electrical machine, with a fan (10), which can be rotated around an axis, wherein air flows into the fan (10) in the axial direction and out of the fan (10) in the radial direction, a bearing plate (12), and a magnet wheel (14), wherein a flow conduit (16) is at least partially bounded by the bearing plate (12) and the magnet wheel (14) and the flow cross section of the flow conduit (16) is essentially constant in the radial direction.

2 Claims, 3 Drawing Sheets

US 6,874,991 B2

FAN ARRANGEMENT FOR AN ELECTRICAL MACHINE

BACKGROUND OF THE INVENTION

The invention relates to a fan apparatus for an electrical machine, with a fan, which can rotate around an axis and causes air to flow into the fan axially and out of the fan radially, a bearing plate, and a magnet wheel, in which a flow conduit is at least partially bounded by the bearing plate and the magnet wheel.

Operation of electrical machines naturally involves the generation of heat. It is desirable to dissipate this heat. Fans are frequently used for this purpose; they are supported so that they can rotate around the axis of the electrical machine. Upon rotation of the fan, air flows axially into the fan and radially out of the fan.

In generators that are used in motor vehicles, the housing is partially embodied as a bearing plate. Such a bearing plate extends radially outward from the bearing of a rotor shaft and then constitutes part of the axially extending outer surface of the generator. As a result, the bearing plate influences both the inflow and outflow of the cooling air.

It is disadvantageous that bearing plates of the prior art are embodied with sharp edges, which result in flow separations and turbulence. Such a disrupted flow generates noise and impairs the fan output.

FIG. 1 shows an apparatus including a fan 110 and bearing plate 112 of the prior art. The apparatus is part of a three-phase generator; only the upper half of the generator is partially depicted, extending to the center line 130. The lower half of the three-phase generator, which is not shown, is mirror symmetrical to the one shown. Air enters the fan 110 from the left in the vicinity of the fan inlet 132 and exits the fan in the radial direction in region 134. It is clear that before entry into the fan 110, the air must pass the bearing plate 112 so that influence is exerted on the air by the bearing plate 112 and in particular by the sharp edges that are generally present. The bearing plate 112 borders the air exit region 134 on one side and the magnet wheel 136 of the rotary current generator borders it on the other.

Since the distance between the bearing plate 112 and the magnet wheel 136 in the axial direction is constant, the flow cross section of the flow conduit 138 increases in the radial direction as a function of circular geometry. Consequently, the flow conduit 138 functions as a diffuser so that flow separations can occur. This impairs the fan output. Another disadvantageous effect of the apparatus including the fan 110 and bearing plate 112 of the prior art is that due to the distance between the fan 110 and the bearing plate 112, a recirculation flow 140 can occur. Since heated air consequently enters into the fan 110, this reduces the efficiency of the fan 110.

SUMMARY OF THE INVENTION

The invention builds on the fan apparatus of this generic type, by virtue of the fact that the flow cross section of the flow conduit is essentially constant in the radial direction. Therefore the flow cross section does not increase in the radial direction, as is the case with the prior art. Rather, the flow cross section is at least approximately constant. This prevents the flow conduit from functioning as a diffuser. Flow separations are thus prevented.

In a preferred embodiment, the flow cross section is essentially constant due to an adaptation of the form of the bearing plate. The bearing plate is formed so that the axial spacing between the magnet wheel and the bearing plate decreases toward the outside in the radial direction. As a result, the widening of the flow conduit due to circular geometry can be compensated for so that in the end, a flow conduit can be produced with an essentially constant flow cross section.

It is preferable that there be a minimal radial distance between the bearing plate and the fan in the inflow region. This minimal radial distance prevents a backflow of already heated air. This prevention of a recirculation flow improves the efficiency of the fan since the fan consequently takes in almost exclusively air that has not been preheated. Furthermore, the minimal radial distance in the inflow region of the fan prevents a pressure balancing between the inflow region and the outflow region. This exerts a positive influence on the flow behavior and efficiency of the fan.

In a particularly preferable embodiment, the bearing plate has rounded edges. This prevents flow separations and turbulence, which have been found to be disadvantageous in the prior art due to the sharp edges of the fan. The fan therefore functions quietly and with a high output.

In a particularly preferable embodiment, radial struts of the bearing plate are provided, around which air flowing into the fan subsequently flows; the radial struts taper in the axial direction. Such a tapering of the radial struts exerts a positive influence on the flow behavior of the incoming air. The tapering of the struts is symmetrical.

In this connection, it is particularly advantageous that the radial struts of the bearing plate have cross sections that are teardrop-shaped in the axial direction. A teardrop-shaped of this kind has the above-mentioned tapering cross section in the flow direction of the incoming air.

The invention is based on the knowledge that the flow behavior and finally, the efficiency of a fan of an electrical machine can be improved through an essentially constant flow cross section of the flow conduit. It is particularly preferable if the uniformity of the flow is further encouraged by a rounded design of the bearing plate.

BRIEF DESCRIPTION OF THE DRAWING

The invention will now be explained by way of example in conjunction with preferred embodiments with reference to the accompanying drawings.

DETAILED DESCRIPTION OF THE PREFERRED EMBODIMENTS

Figure 1:
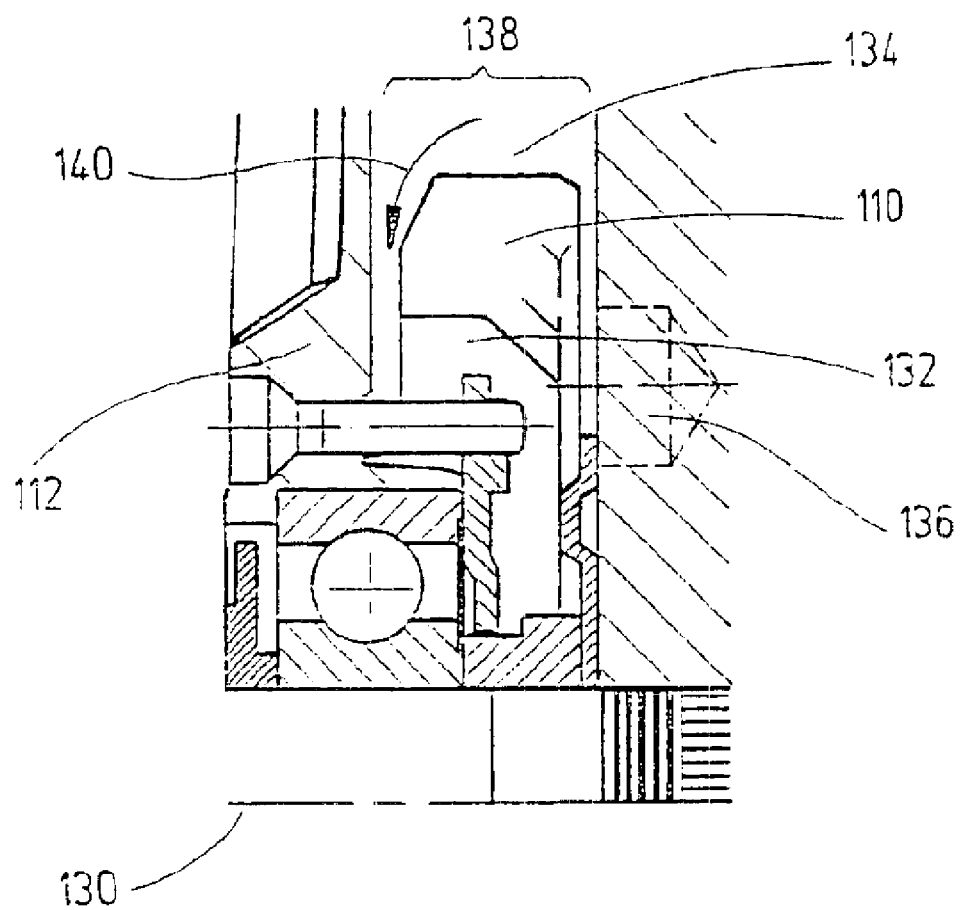
FIG. 1 shows an apparatus, with a fan and bearing plate, from the prior art.

The depiction of the prior art according to FIG. 1 has already been explained in the general section of this specification.

Figure 2:
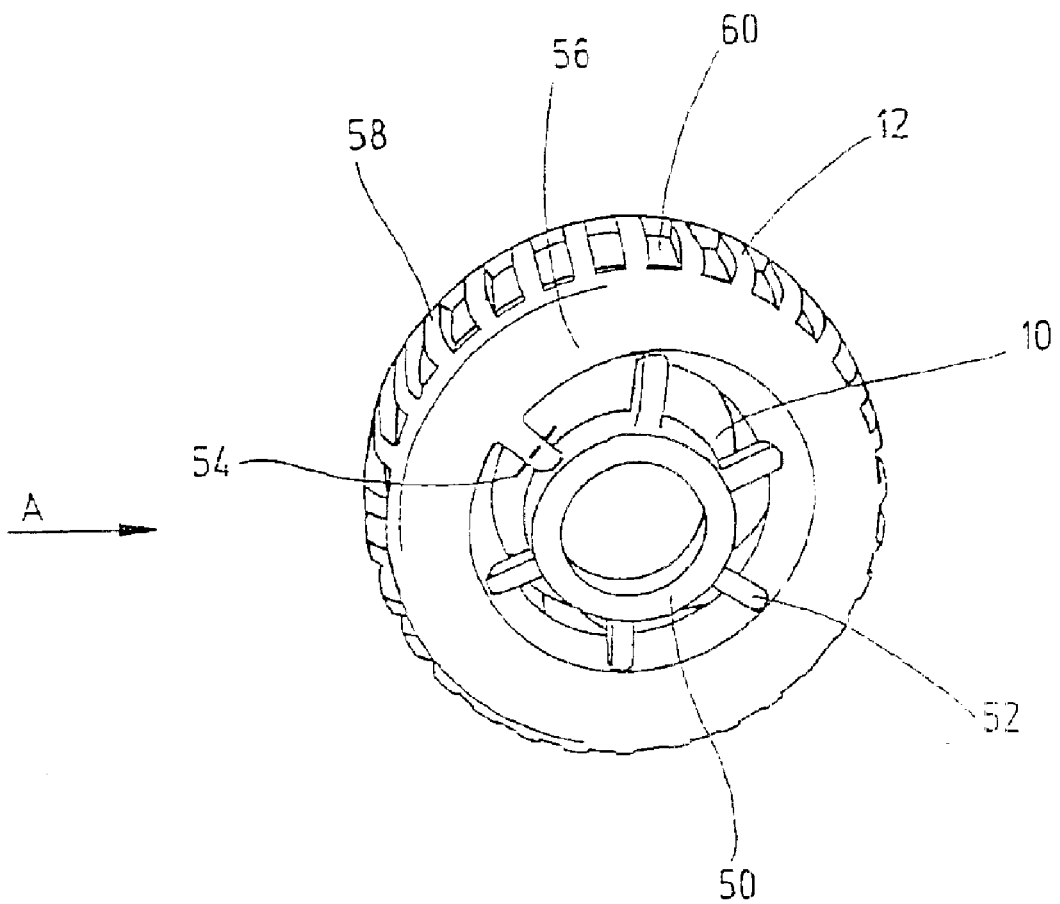
FIG. 2 shows a bearing plate for use in a fan apparatus according to the invention.

FIG. 2 shows a perspective depiction of a bearing plate 12 and the associated apparatus of a fan 10 according to the current invention. The bearing plate 12 has an essentially cylindrical region 50 close to the axis. A number of struts 52 extend from this cylindrical region 50. These struts 52 are wider on the side oriented toward the viewer and taper in the direction toward the fan 10. The cross section of the struts 52 is teardrop-shaped along an intersecting plane that is aligned axially and is indicated by the dashed line 54. A rounded region 56 of the bearing plate adjoins the struts 52. This rounded region 56 transitions into a region 58 that extends in the axial direction. The region 58 extending in the axial direction has a number of openings 60, which permit the heated air to escape.

Figure 3:
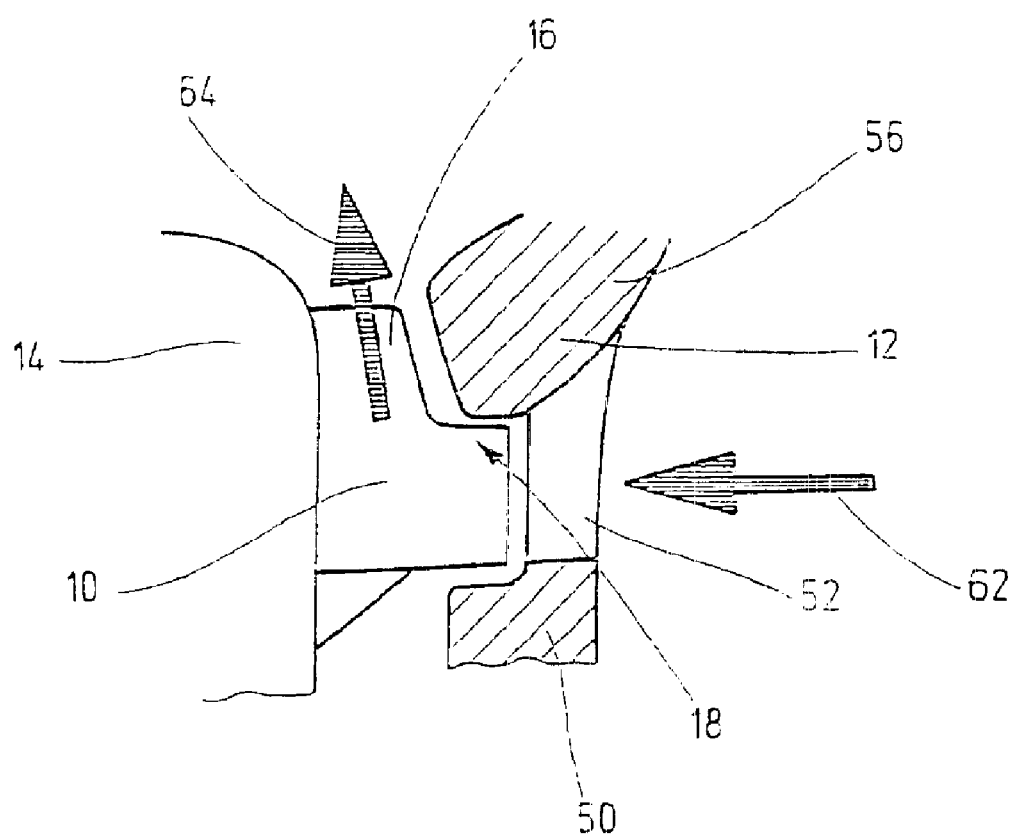
FIG. 3 shows an apparatus, with a fan and bearing plate, according to the invention.

FIG. 3 shows a sectional view of a fan apparatus according to the invention. Only a part of the apparatus is shown. The drawing shows the fan 10, the bearing plate 12, and the magnet wheel 14. The view of the bearing plate 12 corresponds to a radial section through the bearing plate according to FIG. 2; the viewing direction corresponds to the one labeled A in FIG. 2. The central, essentially cylindrical part 50 of the bearing plate 12 is shown. The drawing also shows a strut 52. The rounded part 56 of the bearing plate, on its side oriented toward the fan, is shaped so that the axial distance between the bearing plate 12 and the magnet wheel 14 decreases in the radial direction toward the outside. This produces a flow conduit 16 with an approximately constant flow cross section. The increase in the flow cross section due to the circular geometry in the radial direction is compensated for by the decrease in the axial distance between the magnet wheel 14 and the bearing plate 12. The drawing also shows that there is a minimal radial distance 18 between the bearing plate 12 and the fan 10 in the inflow region of the air 62. This minimal radial distance 18 assures that the outgoing air 64 does not flow back through the flow conduit 16 into the inflow region of the air. Consequently, the disadvantageous recirculation flow of the prior art does not occur. Furthermore, a pressure balancing between the inflow region and the outflow region is prevented, which produces a further increase in the fan output. The axial distance between the bearing plate 12 and the fan 10 is selected to be greater than the minimal radial distance 18. This has advantages with regard to the compensation of tolerances, particularly of those that arise during manufacturing.

The above description of exemplary embodiments according to the current invention is merely intended for illustrative purposes and not to limit the invention. In the context of the invention, various changes and modifications are possible without going beyond the scope of the invention and its equivalents.

What is claimed is:

1. A fan apparatus for an electrical machine, comprising:
    a fan (10), which can be rotated around an axis, wherein air flows into the fan (10) in the axial direction and out of the fan (10) in the radial direction,
    a bearing plate (12), and
    a magnet wheel (14), wherein a flow conduit (16) is at least partially bounded by the bearing plate (12) and the magnet wheel (14), wherein the bearing plate (12) and the fan (10) are arranged relative to one another so that one part of the bearing plate (12) and one part of the fan (10) form there between a flow conduit (16) of an essentially constant cross section in a radial direction, while another part of the bearing plate (12) and another part of the fan (10) form there between a minimal radial distance (18) in an inflow region of the fan (10).

2. The fan apparatus according to claim 1, wherein the bearing plate (12) has rounded edges.

* * * * *